United States Patent
Dubosc (10) Patent No.: US 12,441,460 B2
(45) Date of Patent: Oct. 14, 2025

(54) BLADE FOR AN UNDUCTED FAN OF A TURBOMACHINE

(71) Applicant: SAFRAN AIRCRAFT ENGINES, Paris (FR)

(72) Inventor: Matthieu Pierre Michel Dubosc, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/713,904

(22) PCT Filed: Nov. 29, 2022

(86) PCT No.: PCT/FR2022/052189
§ 371 (c)(1),
(2) Date: May 28, 2024

(87) PCT Pub. No.: WO2023/094784
PCT Pub. Date: Jun. 1, 2023

(65) Prior Publication Data
US 2025/0033760 A1  Jan. 30, 2025

(30) Foreign Application Priority Data

Nov. 29, 2021 (FR) ........................... 2112684

(51) Int. Cl.
*F01D 5/14* (2006.01)
*B64C 11/18* (2006.01)

(52) U.S. Cl.
CPC .............. *B64C 11/18* (2013.01); *F01D 5/147* (2013.01); *F01D 5/141* (2013.01); *F05D 2240/303* (2013.01); *F05D 2240/304* (2013.01)

(58) Field of Classification Search
CPC ........... F01D 5/141–145; F04D 29/384; F04D 29/325; F04D 29/324; F04D 29/386;
(Continued)

(56) References Cited

U.S. PATENT DOCUMENTS 5,642,985 A * 7/1997 Spear ...................... F01D 5/141
415/181
6,899,526 B2 * 5/2005 Doloresco ............... F01D 5/141
416/243

(Continued)

FOREIGN PATENT DOCUMENTS

FR  3 002 781 A1  9/2014
FR  3 107 918 A1  9/2021
(Continued)

OTHER PUBLICATIONS

French Preliminary Search Report and Written Opinion dated Jul. 11, 2022, issued in French Application No. FR2112684.
(Continued)

*Primary Examiner* — Courtney D Heinle
*Assistant Examiner* — Behnoush Haghighian
(74) *Attorney, Agent, or Firm* — Sughrue Mion, PLLC (57) ABSTRACT

A blade for an unducted fan of a turbomachine includes an airfoil formed of plural airfoil sections that are stacked along an airfoil axis. A difference in sweeps corresponding to a difference between a leading edge sweep and a trailing edge sweep is negative, and substantially between −30° and 0°, for any airfoil section whose height is between 10% and 30% of an airfoil height of the airfoil, and is positive, and substantially between 0° and +40°, for any airfoil section whose height is between 50% and 90% of the airfoil height.

19 Claims, 2 Drawing Sheets

(58) Field of Classification Search
CPC .. F04D 29/30; F04D 29/284; F05D 2240/303; F05D 2240/304
See application file for complete search history.

(56) References Cited

U.S. PATENT DOCUMENTS

| | | | | |
|---|---|---|---|---|
| 7,108,486 | B2* | 9/2006 | Talbotec | F04D 29/324 416/243 |
| 7,806,653 | B2* | 10/2010 | Burton | F01D 5/145 415/191 |
| 7,967,571 | B2* | 6/2011 | Wood | F04D 29/384 416/243 |
| 8,147,207 | B2* | 4/2012 | Orosa | F04D 29/324 416/223 R |
| 8,317,482 | B2* | 11/2012 | Bois | F01D 5/141 416/228 |
| 9,017,037 | B2* | 4/2015 | Baltas | F01D 5/141 416/243 |
| 9,353,628 | B2* | 5/2016 | Gallagher | F04D 29/384 |
| 9,359,064 | B2* | 6/2016 | Murooka | F01D 5/141 |
| 9,399,917 | B2* | 7/2016 | Gallagher | F01D 5/145 |
| 9,574,574 | B2* | 2/2017 | Gallagher | F04D 29/325 |
| 9,605,542 | B2* | 3/2017 | Gallagher | F02K 3/06 |
| 9,777,580 | B2* | 10/2017 | Gallagher | F04D 29/384 |
| 9,988,908 | B2* | 6/2018 | Gallagher | F04D 29/325 |
| 10,036,257 | B2* | 7/2018 | Gallagher | F01D 15/12 |
| 10,221,859 | B2* | 3/2019 | Moeckel | F04D 29/324 |
| 10,309,414 | B2* | 6/2019 | Gallagher | F04D 29/384 |
| 10,330,111 | B2* | 6/2019 | Billings | F02C 7/36 |
| 10,422,226 | B2* | 9/2019 | Gallagher | F02C 7/36 |
| 10,458,272 | B2* | 10/2019 | Tran | G01M 15/14 |
| 10,465,702 | B2* | 11/2019 | Gallagher | F04D 29/563 |
| 10,794,192 | B2* | 10/2020 | Gallagher | F01D 15/12 |
| 11,041,507 | B2* | 6/2021 | Gallagher | F04D 29/384 |
| 2004/0170502 | A1* | 9/2004 | Talbotec | F04D 29/324 416/223 R |
| 2005/0031454 | A1* | 2/2005 | Doloresco | F01D 5/141 416/238 |
| 2008/0107538 | A1* | 5/2008 | Bois | F04D 29/681 416/223 A |
| 2010/0054946 | A1* | 3/2010 | Orosa | F04D 29/324 416/223 R |
| 2010/0260609 | A1* | 10/2010 | Wood | F01D 5/141 416/223 R |
| 2013/0164488 | A1 | 6/2013 | Wood et al. | |
| 2013/0189117 | A1* | 7/2013 | Baltas | F01D 5/141 416/243 |
| 2013/0323065 | A1* | 12/2013 | Murooka | F01D 5/141 416/224 |
| 2015/0354363 | A1* | 12/2015 | Gallagher | F01D 15/12 416/223 A |
| 2015/0354364 | A1* | 12/2015 | Gallagher | F04D 29/324 416/223 A |
| 2015/0354367 | A1* | 12/2015 | Gallagher | F04D 29/384 416/226 |
| 2016/0024929 | A1* | 1/2016 | Gallagher | F01D 5/141 416/223 A |
| 2016/0108753 | A1* | 4/2016 | Tran | C09D 183/04 415/213.1 |
| 2016/0298643 | A1* | 10/2016 | Gallagher | F04D 29/384 |
| 2016/0341213 | A1* | 11/2016 | Gallagher | F02C 3/067 |
| 2017/0122336 | A1* | 5/2017 | Billings | F01D 5/141 |
| 2017/0130586 | A1* | 5/2017 | Gallagher | F04D 29/325 |
| 2017/0175760 | A1* | 6/2017 | Gallagher | F04D 29/544 |
| 2017/0191494 | A1* | 7/2017 | Gallagher | F04D 29/325 |
| 2017/0227016 | A1* | 8/2017 | Moeckel | F04D 29/324 |
| 2017/0241268 | A1* | 8/2017 | Gallagher | F02C 7/36 |
| 2018/0016912 | A1* | 1/2018 | Gallagher | F01D 5/145 |
| 2019/0063227 | A1* | 2/2019 | Gallagher | F01D 5/141 |
| 2020/0149546 | A1* | 5/2020 | Gallagher | F01D 5/141 |

FOREIGN PATENT DOCUMENTS

| | | |
|---|---|---|
| WO | 2013/050724 A1 | 4/2013 |
| WO | 2022/084615 A1 | 4/2022 |

OTHER PUBLICATIONS

International Search Report and Written Opinion dated Mar. 2, 2023, issued in International Application No. PCT/FR2022/052189.

* cited by examiner

Figure 1

Figure 2

BLADE FOR AN UNDUCTED FAN OF A TURBOMACHINE

CROSS REFERENCE TO RELATED APPLICATIONS

This application is a National Stage of International Application No. PCT/FR2022/052189 filed on Nov. 29, 2022, claiming priority based on French Patent Application No. 2112684 filed on Nov. 29, 2021, the contents of each of which being herein incorporated by reference in their entireties.

FIELD OF THE INVENTION

The invention relates to the field of turbomachines, and more specifically the field of blades for an unducted fan of a turbomachine.

PRIOR ART

An aircraft conventionally comprises at least one turbomachine to ensure its propulsion.

The turbomachine comprises a fan, at least one compressor, a combustion chamber, at least one turbine, and a gas exhaust nozzle. For example, the turbomachine may comprise a low-pressure compressor and a high-pressure compressor, and a high-pressure turbine and a low-pressure turbine.

The high-pressure turbine rotationally drives the high-pressure compressor by way of a high-pressure shaft, and the low-pressure turbine rotationally drives the low-pressure compressor by way of a low-pressure shaft. The low-pressure turbine can also rotationally drive the fan either directly by way of the low-pressure shaft, or by way of a reduction gear disposed between the low-pressure turbine and the fan, the reduction gear being rotationally driven by the low-pressure shaft.

The fan or propeller is not ducted. The turbomachine is therefore an unducted fan (also called an open rotor, or propfan).

A fan blade of a turbomachine is conventionally designed so as to respect both aerodynamic stresses with the aim of optimizing the aerodynamic flow along the blade, and mechanical stresses with the aim of allowing the structural withstand of the blade and its incorporation into the turbomachine. In particular, the sweep of the blade at the level of its leading edge participates in the capture of the flow and the retaining of the blade at the intake, and the sweep of the blade at the level of its trailing edge affects the cord and the mechanics of the blade. The variation of the leading edge sweep and the trailing edge sweep along the height of the blade also affects the aerodynamics and the mechanics of the blade.

Furthermore, the design of a fan blade, particularly the choice of its leading edge sweep and its trailing edge sweep, varies according to the architecture of the turbomachine, for example according to the presence or otherwise of a reduction gear in the turbomachine, or according to the presence of otherwise of a system of variable setting for the fan blades.

The document WO 2013/050724 A1 describes an equation of variation of a sweep angle at the level of the leading edge of a turbomachine fan blade in a blade root area. Nonetheless, this equation of variation only makes it possible to partially guide the design of the blade, since it is limited to the root area of the blade.

SUMMARY OF THE INVENTION

One aim of the invention is to make provision for a blade for an unducted fan of a turbomachine which has an optimized aero-mechanical trade-off.

Another aim of the invention is to make provision for a blade for an unducted fan of a turbomachine which can be implemented for different turbomachine architectures.

Another aim of the invention is to make provision for a parameterization of a blade for an unducted fan of a turbomachine, the parameterization being a function of the leading edge sweep and of the trailing edge sweep, and making it possible to satisfactorily guide the design of such a sweep for various turbomachine architectures.

For this purpose provision is made, according to a first aspect of the invention, for a blade for an unducted fan of a turbomachine, the turbomachine extending around a longitudinal axis, in which the blade comprises an airfoil with an aerodynamic profile having a leading edge and a trailing edge, the airfoil being formed of a plurality of airfoil sections stacked along an airfoil axis from a radially inner end all the way to a radially outer end of the airfoil, an airfoil height corresponding to a distance along the airfoil axis from the radially inner end to the radially outer end of the airfoil, in which each airfoil section has a leading edge sweep corresponding to an angle between the airfoil axis and a median segment of the leading edge within said airfoil section, and wherein each airfoil section has a trailing edge sweep corresponding to an angle between the airfoil axis and a median segment of the trailing edge within said airfoil section, the blade being characterized in that a sweep difference corresponding to a difference between the leading edge sweep and the trailing edge sweep within one and the same airfoil section is:

negative, the sweep difference being strictly less than 0° and being moreover greater than −30°, for any airfoil section having a height between 10% and 30% of the airfoil height, and positive, the sweep difference being strictly greater than 0° and being moreover less than +40°, for any airfoil section having a height between 50% and 90% of the airfoil height.

Certain preferred but non-limiting features of the blade according to the first aspect are as follows, taken individually or in combination:

each airfoil section extends over at least 1% and at the most 10% of the airfoil height, preferably each airfoil section extends over approximately 5% of the airfoil height;

the sweep difference changes sign between two airfoil sections each having a height between 30% and 50% of the airfoil height, more specifically between two airfoil sections each having a height between 30% and 40% of the airfoil height;

the sweep difference is between −20° and 0° for any airfoil section having a height between 10% and 30% of the airfoil height, and/or the sweep difference is between +100 and +30° for any airfoil section having a height between 60% and 90% of the airfoil height;

the sweep difference is strictly increasing with height for airfoil sections having heights ranging from 30% to 70% of the airfoil height, more specifically for airfoil sections having heights ranging from 20% to 80% of the airfoil height, more specifically for airfoil sections having heights ranging from 10% to 90% of the airfoil height.

the sweep difference increases in a substantially linear manner with the height for airfoil sections having heights ranging from 30% to 70% of the airfoil height, more specifically for airfoil sections having heights ranging from 20% to 90% of the airfoil height.

According to a second aspect, the invention makes provision for an unducted fan for a turbomachine comprising a plurality of blades according to the first aspect.

Optionally, the fan comprises fewer than 19 blades, for example between 10 and 19 blades, for example 12 blades.

According to a third aspect, the invention makes provision for a turbomachine comprising an unducted fan according to the second aspect (an open rotor or propfan).

According to a fourth aspect, the invention makes provision for an aircraft comprising at least one turbomachine according to the third aspect.

DESCRIPTION OF THE FIGURES

Other features, aims and advantages of the invention will become apparent from the following description, which is purely illustrative and non-limiting, and which must be read with reference to the appended drawings wherein.

DETAILED DESCRIPTION OF THE INVENTION

In this application, upstream and downstream are defined with respect to the normal direction of flow of the gas in the fan through the turbomachine, an air stream flowing through the turbomachine from upstream to downstream. The longitudinal axis corresponds to an axis of rotation of the turbomachine fan. A radial axis is an axis perpendicular to the longitudinal axis and passing through it. A longitudinal direction, or a radial direction respectively, corresponds to the direction of the longitudinal axis or of the radial axis respectively.

The terms "internal" and "external", respectively, are used with reference to a radial direction such that the inner part or face of an element is closer to the longitudinal axis than the outer part or face of the same element.

The turbomachine extends around a longitudinal axis.

The turbomachine comprises a fan, at least one compressor, a combustion chamber, at least one turbine, and a gas exhaust nozzle. For example, the turbomachine may comprise a low-pressure compressor and a high-pressure compressor, and a high-pressure turbine and a low-pressure turbine.

The high-pressure turbine rotationally drives the high-pressure compressor by way of a high-pressure shaft, and the low-pressure turbine rotationally drives the low-pressure compressor by way of a low-pressure shaft. The low-pressure turbine can also rotationally drive the fan either directly by way of the low-pressure shaft, or by way of a reduction gear disposed between the low-pressure turbine and the fan, the reduction gear being rotationally driven by the low-pressure shaft.

The fan, or propeller, is not ducted. The turbomachine is therefore an unducted (open rotor, or propfan) fan.

The turbomachine fan comprises a fan disc bearing a plurality of fan blades 1.

Each blade 1 can be a composite blade 1 comprising a structure made of composite material including a fiber reinforcement obtained by three-dimensional weaving and a matrix in which the fiber reinforcement is embedded.

The fiber reinforcement can be formed of a fiber preform as a single part obtained by three-dimensional or multilayer weaving with varying thickness. The fiber reinforcement may then comprise warp and weft strands which may in particular comprise fibers made of carbon, glass, basalt, and/or aramid. The matrix can be a polymer matrix, for example epoxide, bismaleimide or polyimide. The blade 1 is then formed by molding by means of a resin vacuum injection method of RTM (Resin Transfer Molding), or else VARRTM (Vacuum Resin Transfer Molding).

Figure 1:
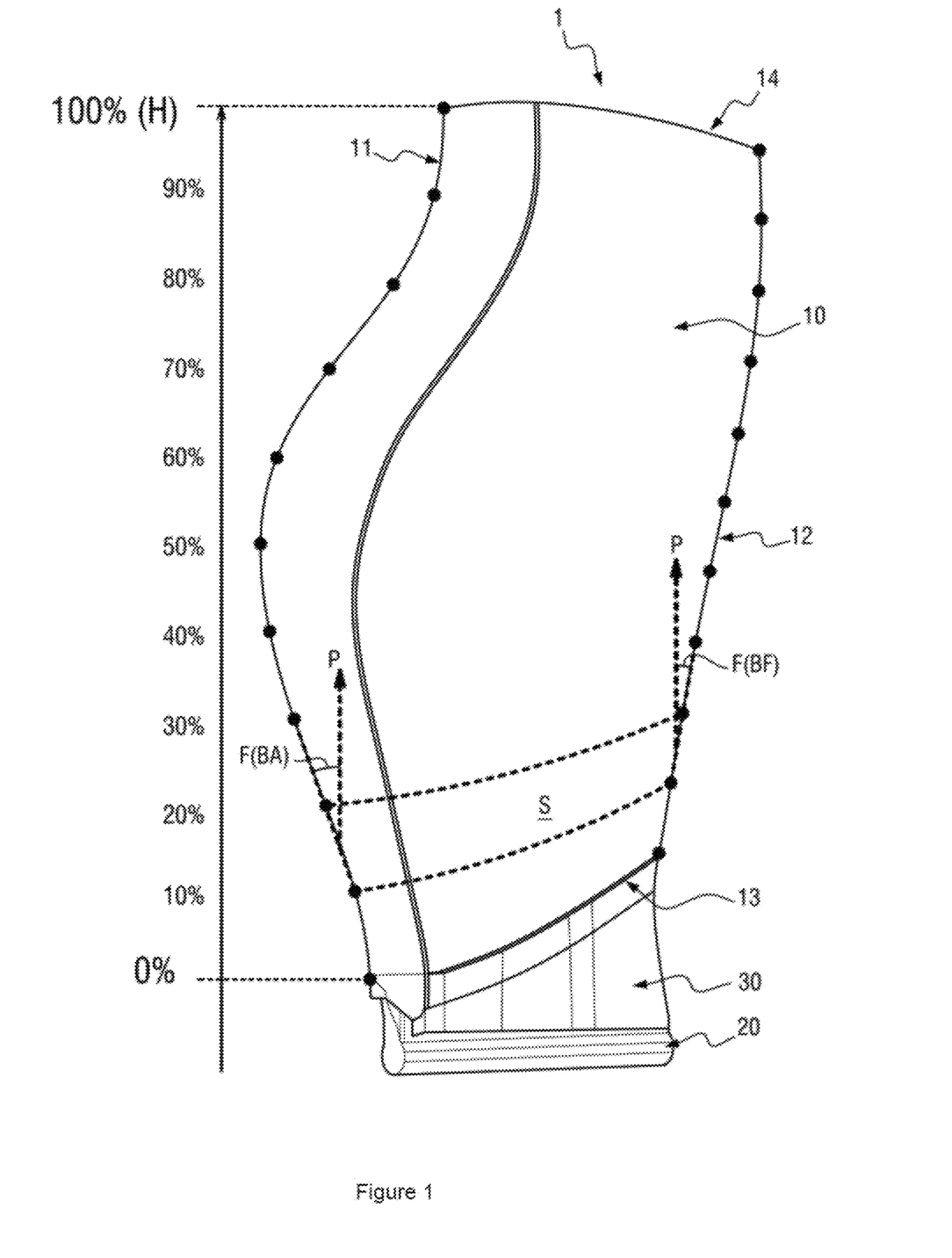
FIG. 1 illustrates a schematic perspective view of a blade according to an embodiment of the invention, comprising an airfoil formed from a plurality of airfoil sections stacked along an airfoil axis.

A blade 1 for a fan of a turbomachine is illustrated by way of non-limiting example in FIG. 1.

The blade 1 comprises an airfoil 10 with an aerodynamic profile having a leading edge 11 and a trailing edge 12. The airfoil 10 is formed of a plurality of airfoil sections S stacked along an airfoil axis P from a radially inner end 13 all the way to a radially outer end 14 of the airfoil 10. An airfoil height H corresponds to a distance along the airfoil axis P from the inner radially end 13 to the radially outer end 14 of the airfoil 10.

The airfoil 10 with aerodynamic profile is suitable for being placed in an air stream flowing at the level of the turbomachine when the turbomachine is in operation in order to generate a lift.

More precisely, the airfoil 10 can be suitable for extending in a flow space where ambient air flows out of the turbomachine, the airfoil 10 being disposed outside of the turbomachine, particularly outside of the turbomachine nacelle. The radially inner end 13 of the airfoil 10 can be radially located substantially at the level of the turbomachine nacelle, the nacelle delimiting an inner wall of the flow space. The radially outer end 14 of the airfoil 10 can be radially distant from the turbomachine nacelle, outside of the nacelle.

The blade 1 can further comprise a root 20 and a shank 30. The root 20 is intended to allow the attachment of the blade 1 to the fan disc and for this purpose extends between a bottom of a cavity formed in the fan disc and the exit of the bearing surfaces of the cavity.

The shank 30 corresponds to the area which extends between the root 20 and the airfoil 10, i.e. between the exit of the bearing surfaces of the disc and the radially inner end 13 of the airfoil 10. The root 20 is located at a radially more inward position than the shank 30, and the shank 30 is located at a radially more inward position than the airfoil 10.

The leading edge 11 and the trailing edge 12 of the airfoil 10 are connected by a pressure face and a suction face.

The leading edge 11 of the airfoil 10 forms an upstream end of the airfoil 10 in the flow space. It corresponds to the anterior part of an aerodynamic profile that faces the air stream and that divides the air flow into a pressure face flow and a suction face flow. The leading edge 11 of the airfoil 10 is thus configured to extend facing the flow of the gas around the turbomachine. The trailing edge 12 corresponds to the posterior part of the aerodynamic profile, where the pressure face and surface face flows meet, and forms a downstream end of the airfoil 10 in the flow space. In the non-limiting example illustrated in FIG. 1, the blade 1 is equipped with a shield, the leading edge of the airfoil 10 corresponding to the upstream end of the shield.

The leading edge 11 may correspond to a line extending over the entire height of the airfoil 10 and formed by the set of points located at a position the furthest upstream of the airfoil 10, the leading edge line connecting the upstream point of the radially inner end 13 to the upstream point of the radially outer end 14 of the airfoil 10. The trailing edge 12 may correspond to a line extending over the entire height of the airfoil 10 and formed by the set of points located at a position the furthest downstream of the airfoil 10, the trailing edge line connecting the downstream point of the radially inner end 13 to the downstream point of the radially outer end 14 of the airfoil 10.

The airfoil axis P can be an axis inclined by a few degrees with respect to the radial axis, or be a substantially radial axis. The radially inner end 13 of the airfoil 10 corresponds to an end of the airfoil 10 which is opposite the radially outer end 14 of the airfoil 10 with respect to the airfoil axis P.

The term "height" is used to denote a distance along the airfoil axis P. Thus, the airfoil 10 has an airfoil height H corresponding to the distance along the airfoil axis P between its radially inner end 13 and its radially outer end 14.

The height of an airfoil section S corresponds to a median height of the airfoil section S, i.e. the median of a height of the most inward point and of a height of the most outward point of said airfoil section S.

The airfoil height H can vary along the longitudinal axis, for example due to the outer cut-out of the blade 1. In the rest of the application, the height of a point or of a section S of the airfoil 10 is expressed as a function of the relative height of said point or of said airfoil section S with respect to the airfoil height H, the relative height being defined between 0% and 100%.

Thus, the radially inner end 13 of the airfoil 10 is located at 0% of the airfoil height H, and the radially outer end 14 of the airfoil 10 is located at 100% of the airfoil height H. A height of 0% thus does not correspond to a position of the root 20 of the blade 1, but to a position of the inner wall of the flow space, generally delimited by the nacelle. An airfoil section S having a height of 15% corresponds to an airfoil section S located, on average, at 15% of the airfoil height H, for example an airfoil section S extending substantially between 10% and 20% of the airfoil height H, and as illustrated by way of non-limiting example in FIG. 1. The height of a point on the leading edge 11, or of a point on the trailing edge 12 respectively, of the airfoil 10, is expressed as a function of the relative height of said leading edge point 11, or trailing edge 12 respectively, with respect to the airfoil height H at the level of the leading edge 11, or of the trailing edge 12 respectively.

The sweep angle F(BA), F(BF), as illustrated in FIG. 1, is defined in accordance with the document by Leroy H. Smith and al. "Sweep and Dihedral Effects in Axial-Flow Turbomachinery", September 1963, Journal of Basic Engineering, 401-414. The geometrical approach is used without taking into account the fluid angles which are dependent on the cycle point. If the flow is purely axial, which is the case overall, and if one considers, for example, a fixed blading with a constant setting over its height, the leading edge sweep F(BA) expresses an inclination of the leading edge 11, more specifically of the leading edge line, with respect to the airfoil axis P. Similarly, the sweep of the trailing edge F(BF) expresses an inclination of the trailing edge 12, more specifically of the trailing edge line with respect to the airfoil axis P. In other words, the airfoil 10 has a non-zero sweep when the direction of the stream flowing at the level of the airfoil 10 is not perpendicular to the direction of the airfoil axis P.

In the rest of the application, the term "positive" is used to mean "strictly greater than 0", the term "negative" is used to mean "strictly less than 0". The terms "between X and Y" are used to mean "greater than or equal to X and less than or equal to Y". The terms "strictly between X and Y" are used to mean "strictly greater than X and strictly less than Y".

For an airfoil section S, a leading edge sweep F(BA), or trailing edge sweep F(BF) respectively, that is positive corresponds to a downstream inclination of the median segment of the leading edge 11, or of the trailing edge 12 respectively, of said airfoil section S. A leading edge sweep F(BA), or trailing edge sweep 12 F(BF) respectively, that is negative, corresponds to an upstream inclination of the leading edge 11, or of the trailing edge 12 respectively, of said airfoil section S. A leading edge sweep F(BA), or trailing edge sweep F(BF) respectively, that is zero, corresponds to a leading edge 11, or to a trailing edge 12 respectively, oriented substantially along the airfoil axis P.

The sweep difference Delta of an airfoil section S, i.e. the difference between the leading edge sweep F(BA) and the trailing edge sweep F(BF) of the airfoil section S, is obtained by subtracting the value of the trailing edge sweep F(BF) from the value of the leading edge sweep F(BA) of the airfoil section S:

$$\text{Delta}(S) = F(BA) - F(BF),$$

where Delta (S) is the sweep difference Delta, F(BA) is the leading edge sweep F(BA), and F(BF) is the trailing edge sweep F(BF), for the given airfoil section S.

In the rest of the application, the sweep is determined with a certain tolerance. Thus, a sweep difference Delta is determined to the nearest +/−5°, more specifically to the nearest +/−2°, more specifically to the nearest +/−1°. In other words, if a sweep difference Delta is "zero" or "substantially zero", the two sweep angles are equal to the nearest +/−5°, more specifically to the nearest +/−2°, more specifically to the nearest +/−1°. Also, when a variation is "linear" or "substantially linear", it is linear to the nearest +/−5°, more specifically to the nearest +/−2°, more specifically to the nearest +/−1°.

Each airfoil section S has a leading edge sweep F(BA) corresponding to an angle between the airfoil axis P and a median segment of the leading edge 11 within said airfoil section S, and each airfoil section S has a trailing edge sweep F(BF) corresponding to an angle between the airfoil axis P and a median segment of the trailing edge 12 within said airfoil section S.

A sweep difference Delta corresponding to a difference between the leading edge sweep F(BA) and the trailing edge sweep F(BF) of one and the same airfoil section S is:
  negative, the sweep difference Delta being strictly less than 0° and being moreover greater than or equal to −30°, for any airfoil section S having a height between 10% and 30% of the airfoil height H, and
  positive, the sweep difference Delta being strictly greater than 0° and being moreover less than or equal to +40°, for any airfoil section S having a height between 50% and 90% of the airfoil height H.

The blade 1 described above has an optimized aeromechanical trade-off. Thus, the aerodynamic efficiency of the blade 1 is improved while also respecting the mechanical limitations needed to implement the blade 1 in the turbomachine.

Moreover, the parameterization of the blade is a function of the leading edge sweep and of the trailing edge sweep of the blade, and makes it possible to satisfactorily guide the design of the blade for various turbomachine architectures.

The design of the blade 1 described above can thus be guided using a single parameter, which corresponds to a variation, along the height of the airfoil 10, of the difference between the leading edge sweep F(BA) and the trailing edge sweep F(BF) of the airfoil 10. Thus, the blade 1 can be designed more simply and at a reduced cost.

In addition, the parameter described above is suitable for guiding the design of a blade 1 which is implemented in different turbomachine architectures, for example in a turbomachine comprising or not comprising a reduction gear, in a turbomachine comprising or not comprising variable setting for the blades 1, etc.

For a given airfoil section S, a sweep difference Delta of the airfoil section S that is negative, namely strictly less than 0 (Delta<0), means that, for the given airfoil section S:
- if the leading edge sweep F(BA) is positive (F(BA)>0), i.e. the leading edge 11 is inclined downstream, then the trailing edge sweep F(BF) is positive and is greater than the leading edge sweep F(BA) (F(BF)>0 and (F(BF) >F(BA)), the trailing edge 12 being more inclined downstream than the leading edge 11;
- if the leading edge sweep F(BA) is negative (F(BA)<0), the leading edge 11 being inclined upstream, then:
  - either the trailing edge sweep F(BF) is positive (F(BF) >0), the trailing edge 12 being inclined downstream,
  - or the trailing edge sweep F(BF) is zero (F(BF)=0), a direction of the trailing edge 12 substantially corresponding to a direction of the airfoil axis P,
  - or the trailing edge sweep F(BF) is negative and is less than the leading edge sweep F(BA) (F(BF)<0 and F(BF)<F(BA)), the trailing edge 12 being less inclined upstream than the leading edge 11,
- if the leading edge sweep F(BA) is zero (F(BA)=0), a direction of the leading edge 11 substantially corresponding to a direction of the airfoil axis P, then the trailing edge sweep F(BF) is positive (F(BF)>0), the trailing edge 12 being inclined downstream.

For a given airfoil section S, a sweep difference Delta of the airfoil section S that is positive, namely strictly greater than 0 (Delta>0) means that, for the given airfoil section S:
- if the leading edge sweep F(BA) is positive (F(BA)>0), i.e. the leading edge 11 is inclined downstream, then:
  - either the trailing edge sweep F(BF) is negative (F(BF) <0), the trailing edge 12 being inclined upstream,
  - or the trailing edge sweep F(BF) is zero (F(BF)=0), a direction of the trailing edge 12 substantially corresponding to a direction of the airfoil axis P,
  - or the trailing edge sweep F(BF) is positive and is less than the leading edge sweep F(BA) (F(BF)>0 and F(BF)<F(BA)), the trailing edge 12 being less inclined downstream than the leading edge 11;
- if the leading edge sweep F(BA) is negative (F(BA)<0), the leading edge 11 being inclined upstream, then the trailing edge sweep F(BF) is negative and is greater than the leading edge sweep F(BA) (F(BF)<0 and F(BF)>F(BA)), the trailing edge 12 being more inclined upstream than the leading edge 11;
- if the leading edge sweep F(BA) is zero (F(BA)=0), a direction of the leading edge 11 substantially corresponding to a direction of the airfoil axis P, then the trailing edge sweep F(BF) is negative (F(BF)<0), the trailing edge 12 being inclined upstream.

For a given airfoil section S, a sweep difference Delta of the airfoil section S that is zero (Delta=0) means that, for the given airfoil section S, the leading edge sweep F(BA) and the trailing edge sweep F(BF) are substantially equal (F(BA) =F(BF)), whether they are positive, negative or zero.

Each airfoil section S can be delimited by a substantially conical section which corresponds to a current line of the flow in the flow space along the airfoil 10.

Each airfoil section S can extend over at least 1% and at the most 10% of the airfoil height H, the number of airfoil sections S being between 10 and 100. Thus, the resulting discretization of the airfoil sections S is sufficient to represent the geometry of the airfoil 10.

In particular, each airfoil section S can extend over a height 5% of the airfoil height H, the airfoil 10 being divided into 20 airfoil sections S stacked along the airfoil axis P, an airfoil section S extending over 5% of the airfoil height H.

FIG. 1 illustrates by way of non-limiting example an airfoil 10 comprising 10 airfoil sections S, each airfoil section S extending over 10% of the airfoil height H. More specifically, the intersection points of each of the ten airfoil sections S with the leading edge 11 and with the trailing edge 12 of the airfoil 10 are illustrated in FIG. 1. Furthermore, the leading edge sweep F(BA) and the trailing edge sweep F(BF) of one of the airfoil sections S are illustrated in FIG. 1.

Figure 2:
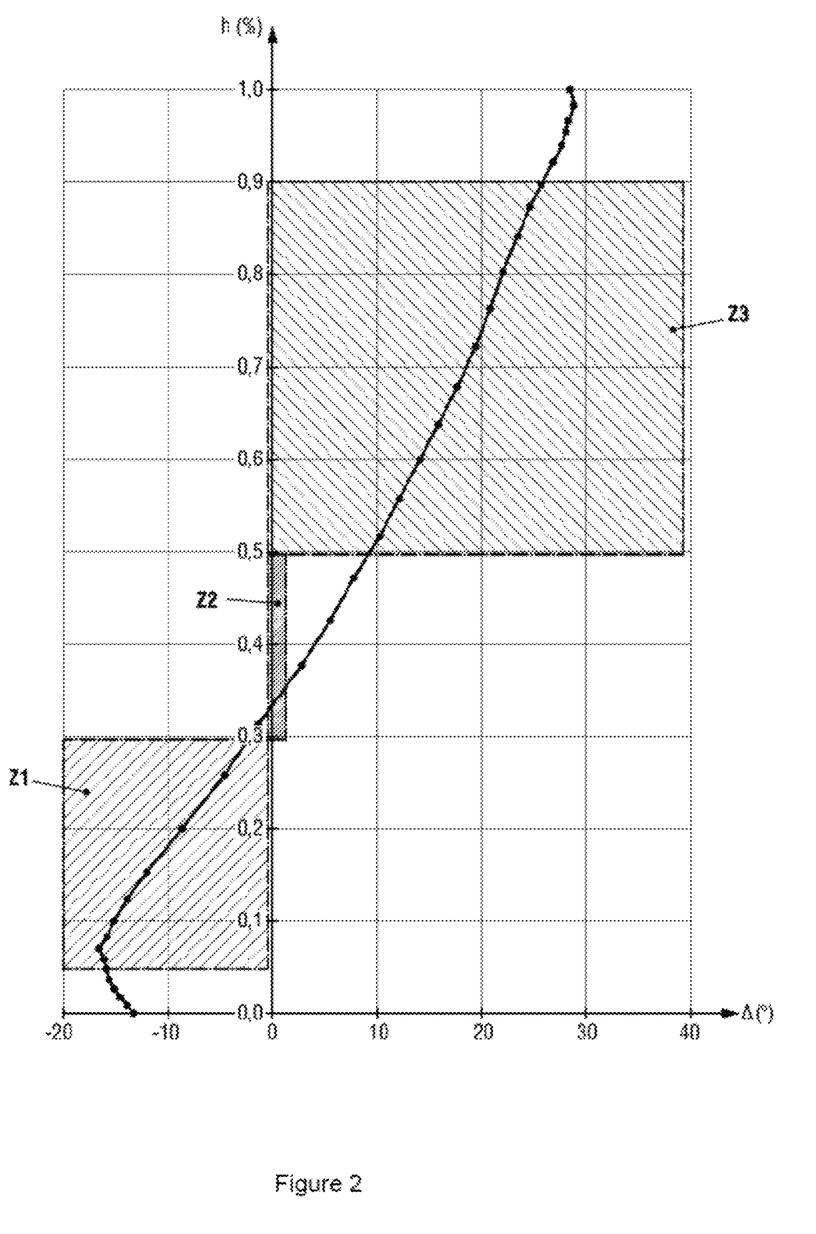
FIG. 2 is a graph illustrating an example of variation of a difference between the leading edge sweep and the trailing edge sweep along a height of a blade according to an embodiment of the invention.

FIG. 2 illustrates by way of non-limiting example a graph of variation of the sweep difference Delta of an airfoil 10 along the height of the airfoil 10, i.e. a parameterization of the differences between the leading edge sweep F(BA) and the trailing edge sweep F(BF) of the sections S of an unducted fan airfoil 10 as a function of the height of the airfoil 10. The abscissa represents the variation in sweep, denoted Delta, and the ordinate represents the relative height, denoted h, and expressed as a percentage (%) of the airfoil height H. It is understood that other variations of the sweep difference Delta, not shown, can be compatible with the airfoil 10.

The values of the sweep difference Delta which are specified below make it possible to obtain a variation in the sweep difference Delta along the height of the airfoil 10 which results in a blade 1 having a yet further improved aero-mechanical trade-off.

The sweep difference Delta is negative, and therefore strictly less than 0°, and is moreover greater than or equal to, or even strictly greater than, −30°, for any airfoil section S having a height between 10% and 30% of the airfoil height H. Thus, an area of the airfoil 10 extending over a height between 10% and 30% of the airfoil height H is a zone of negative sweep difference Z1. The sweep difference Delta is positive, so strictly greater than 0°, and is furthermore less than or equal to, or even strictly less than, +40°, for any airfoil section S having a height between 50% and 90% of the airfoil height H. Thus, an area of the airfoil 10 extending over a height between 50% and 90% of the airfoil height H is a positive sweep difference area Z2. Finally, an area of the airfoil 10 extending over a height between 30% and 50% of the airfoil height H is an area of transition of the sweep difference Z3, in which the sweep difference Delta can be negative, zero or positive.

The sweep difference Delta can be strictly less than 0° and moreover be greater than or equal to, or even strictly greater than, −30°, for any airfoil section S having a height between, or even strictly between, 0%, and 30% of the airfoil height H.

The sweep difference Delta can be strictly less than 0° and moreover be greater than or equal to, or even strictly greater than, −20°, for any airfoil section S having a height between 10%, or even 0%, and 30% of the airfoil height H.

The sweep difference Delta can be strictly greater than 0° and moreover be less than or equal to, or even strictly less than, +30°, for any airfoil section S having a height between 50%, or even 40%, and 90%, or even 100% of the airfoil height H.

The sweep difference Delta can be strictly greater than 0° and moreover be less than or equal to, or even strictly less than, +20°, for any airfoil section S having a height between, or even strictly between, between 40% and 70% of the airfoil height H.

The sweep difference Delta can be equal to −10° for an airfoil section S having a height of 18% of the airfoil height H, and/or can be equal to 0° for an airfoil section S having a height of 33% of the airfoil height H, and/or can be equal to +20° for an airfoil section S having a height of 72% of the airfoil height H.

The sweep difference Delta can change sign between two airfoil sections S each having a height between 30% and 50% of the airfoil height H, more specifically between two airfoil sections S each having a height between 30% and 40% of the airfoil height H. Thus, the sweep difference Delta is negative for a first airfoil section S having a height between 30% and 50%, more specifically between 30% and 40%, of the airfoil height H., and is positive for a second airfoil section S having a height between 30% and 50%, more specifically between 30% and 40%, of the airfoil height H. The second airfoil section S is adjacent to the first airfoil section S and has a height greater than the height of the first airfoil section S, the second airfoil section S being located at a radially outer position with respect to the first airfoil section S. In a variant, the sweep difference Delta can be negative over the first airfoil section S, be substantially zero over the second airfoil section S, then be positive over a third airfoil section S adjacent to the second airfoil section S and having a height greater than the height of the second airfoil section S.

The sweep difference Delta can be between, or even strictly between, −20° and 0°, for any airfoil section S having a height between, or even strictly between, 10% and 30% of the airfoil height H.

The sweep difference Delta can be between, or even strictly between, +100 and +30°, for any airfoil section S having a height between, or even strictly between, 60% and 90% of the airfoil height H.

The sweep difference Delta can be between, or even strictly between, −10° and +10°, for any airfoil section S having a height between, or even strictly between, 20% and 50% of the airfoil height H.

The sweep difference Delta can be between, or even strictly between, −20° and −10°, for any airfoil section S having a height between 10% and 15%, or even between 0% and 15%, of the airfoil height H.

The sweep difference Delta can be between, or even strictly between, +5° and +30°, more specifically between +10° and +30°, for any airfoil section S having a height between 50% and 90%, or even between 50% and 100%, of the airfoil height H.

The sweep difference Delta can be decreasing in proximity to the radially inner and/or radially outer end of the airfoil, and more specifically be decreasing and between −10° and −20° for airfoil sections S having heights ranging from 0% to 5% of the blade height H, and/or be decreasing and between +30° and +20° for airfoil sections S having heights ranging from 95% to 100% of the airfoil height H.

The sweep difference Delta can increase substantially monotonically for airfoil sections S having heights ranging from 20% to 70%, more specifically from 10% to 90%, of the airfoil height H. In other words, the sweep difference Delta is either constant or strictly increasing with height, but does not decrease with height, for airfoil sections S having heights ranging from 20% to 70%, more specifically from 10% to 90%, of the airfoil height H. Thus, for a first airfoil section S1 adjacent and radially inward of a second airfoil section S2, the second airfoil section S2 being adjacent and radially inward of a third airfoil section S3, the sweep difference Delta of the first airfoil section S1 is less than or equal to the sweep difference Delta of the second airfoil section S2, and the sweep difference Delta of the second airfoil section S2 is less than or equal to the sweep difference Delta of the third airfoil section S3:

Delta($S1$)≤Delta($S2$)≤Delta($S3$), where Delta (S1), Delta (S2) and Delta (S3) represent the sweep difference Delta of the first, second and third airfoil sections S1, S2, S3 respectively.

In particular, the sweep difference Delta can be strictly increasing with height for airfoil sections S having heights ranging from 30% to 70% of the airfoil height H, more specifically for airfoil sections S having heights ranging from 20% to 80% of the airfoil height H, more specifically for airfoil sections S having heights ranging from 10% to 90% of the airfoil height H. Thus, the sweep difference Delta of the first airfoil section S1 is strictly less than the sweep difference Delta of the second airfoil section S2, and the sweep difference Delta of the second airfoil section S2 is strictly less than the sweep difference Delta of the third airfoil section S3:

Delta($S1$)<Delta($S2$)<Delta($S3$), where Delta (S1), Delta (S2) and Delta (S3) represent the sweep difference Delta of the first, second and third airfoil sections S1, S2, S3 respectively.

The sweep difference Delta can increase substantially linearly for airfoil sections S having heights ranging from 30% to 70% of the airfoil height H, more specifically for airfoil sections S having heights ranging from 20% to 80% of the airfoil height H, more specifically for airfoil sections S having heights ranging from 10% to 90% of the airfoil height H, the sweep difference Delta being strictly increasing with height. Thus, the sweep difference Delta of the first airfoil section S1 is strictly less than the sweep difference Delta of the second airfoil section S2, and the sweep difference Delta of the second airfoil section S2 is strictly less than the sweep difference Delta of the third airfoil section S3. Furthermore, since the increase is substantially linear, a difference between the sweep difference Delta of the first and second airfoil sections S1, S2 is substantially identical to a difference between the sweep difference Delta of the second and third airfoil sections S2, S3:

$$\text{Delta}(S1) < \text{Delta}(S2) < \text{Delta}(S3), \text{ and}$$

$$\text{Delta}(S3) - \text{Delta}(S2) = \text{Delta}(S2) - \text{Delta}(S1),$$

where Delta (S1), Delta (S2) and Delta (S3) represent the sweep difference Delta of the first, second and third airfoil sections S1, S2, S3 respectively.

An unducted fan for a turbomachine comprises a plurality of blades 1 as described above.

The fan may comprise fewer than 19 blades, for example between 10 and 19 blades, for example 12 blades.

The turbomachine may comprise a reduction gear, such as a reduction mechanism using satellite and planetary gears, sometimes described as of epicyclic type (planetary gear reduction mechanism) or of star gear reduction mechanism type. The reduction gear is placed between the low-pressure shaft and the fan. The reduction gear is rotationally driven by the low-pressure shaft. The fan is then driven by the low-pressure shaft by way of the reduction mechanism and an additional shaft, the so-called fan shaft, which is attached between the reduction mechanism and the fan disc. Thus, the rotation speed of the fan can be optimized independently of the rotation speed of the low-pressure turbine, which makes it possible to achieve higher bypass ratios. In particular, it is possible to reduce the rotation speed of the fan and to increase the power extracted by the low-pressure turbine. Furthermore, the low-pressure shaft can rotate at higher rotation speeds than in conventional turbomachines.

In a variant, it is possible for the turbomachine not to include any reduction gear, in which case the fan is driven directly by the low-pressure turbine via the low-pressure shaft.

The turbomachine may comprise a variable setting system capable of modifying the setting of the blades 1 of the fan so as to optimize the aerodynamic flow around the airfoils 10. The setting of the blades 1 can for example be adapted in flight phases liable to generate an air stream upstream of the airfoils 10 which has an incidence with respect to the longitudinal axis, for example the maneuver, climb or descent phases. Thus, the distribution of the air stream over the airfoils 10 can be homogenized, so as to optimize the thrust supplied by the turbomachine.

In a variant, it is possible for the turbomachine not to comprise a variable setting system for the airfoils 10.

An aircraft conventionally comprises at least one turbomachine as described above.

The invention claimed is:

1. A blade for an unducted fan of a turbomachine, the turbomachine extending around a longitudinal axis, the blade comprising an airfoil with an aerodynamic profile having a leading edge and a trailing edge, the airfoil being formed of a plurality of airfoil sections stacked along an airfoil axis from a radially inner end to a radially outer end of the airfoil, an airfoil height corresponding to a distance along the airfoil axis from the radially inner end to the radially outer end of the airfoil,
    wherein each airfoil section comprises a leading edge sweep corresponding to an angle between the airfoil axis and a median segment of the leading edge within said airfoil section,
    wherein each airfoil section comprises a trailing edge sweep corresponding to an angle between the airfoil axis and a median segment of the trailing edge within said airfoil section,
    wherein a sweep difference of an airfoil section is defined as a difference between the leading edge sweep and the trailing edge sweep, and
    wherein the sweep difference of an airfoil section is:
        less than 0° and greater than −30°, when the airfoil section has a height comprised between 10% and 30% of the airfoil height, and
        greater than 0° and less than +40°, when the airfoil section has a height comprised between 50% and 90% of the airfoil height,
    and wherein the sweep difference changes sign between two airfoil sections each having a height comprised between 30% and 40% of the airfoil height.

2. The blade as claimed in claim 1, wherein each airfoil section extends over at least 1% and at the most 10% of the airfoil height.

3. The blade as claimed in claim 1, wherein each airfoil section extends over 5% of the airfoil height.

4. The blade as claimed in claim 1, wherein the sweep difference of an airfoil section is between −20° and 0° when the airfoil section has a height comprised between 10% and 30% of the airfoil height.

5. The blade as claimed in claim 1, wherein the sweep difference of an airfoil section is between +10° and +30° when the airfoil section has a height comprised between 60% and 90% of the airfoil height.

6. The blade as claimed in claim 1, wherein the sweep difference is increasing with the height for airfoil sections having heights ranging from 30% to 70% of the airfoil height.

7. The blade as claimed in claim 1, wherein the sweep difference is increasing with the height for airfoil sections having heights ranging between 20% to 80% of the airfoil height.

8. The blade as claimed in claim 1, wherein the sweep difference is increasing with the height for airfoil sections having heights ranging between 10% to 90% of the airfoil height.

9. The blade as claimed in claim 1, wherein the sweep difference increases in a linear manner with the height for airfoil sections having heights ranging from 30% to 70% of the airfoil height.

10. The blade as claimed in claim 1, wherein the sweep difference increases in a linear manner with the height for airfoil sections having heights ranging from 20% to 90% of the airfoil height.

11. An unducted fan for a turbomachine comprising a plurality of the blades as claimed in claim 1.

12. The unducted fan as claimed in claim 11, comprising fewer than 19 blades.

13. The unducted fan as claimed in claim 11, comprising between 10 and 19 blades.

14. The unducted fan as claimed in claim 11, comprising 12 blades.

15. A turbomachine comprising the unducted fan as claimed in claim 11.

16. An aircraft comprising the turbomachine as claimed in claim 15.

17. A blade for an unducted fan of a turbomachine, the turbomachine extending around a longitudinal axis, the blade comprising an airfoil with an aerodynamic profile having a leading edge and a trailing edge, the airfoil being formed of a plurality of airfoil sections stacked along an airfoil axis from a radially inner end to a radially outer end of the airfoil, an airfoil height corresponding to a distance along the airfoil axis from the radially inner end to the radially outer end of the airfoil,
    wherein each airfoil section comprises a leading edge sweep corresponding to an angle between the airfoil axis and a median segment of the leading edge within said airfoil section,
    wherein each airfoil section comprises a trailing edge sweep corresponding to an angle between the airfoil axis and a median segment of the trailing edge within said airfoil section, wherein a sweep difference of an airfoil section is defined as a difference between the leading edge sweep and the trailing edge sweep, and wherein the sweep difference of an airfoil section is:
- less than 0° and greater than −30°, when the airfoil section has a height comprised between 10% and 30% of the airfoil height,
- greater than 0° and less than +40°, when the airfoil section has a height comprised between 50% and 90% of the airfoil height, and
- greater than −10° and less than +10°, when the airfoil section has a height comprised between 20% and 50% of the airfoil height.

18. A blade for an unducted fan of a turbomachine, the turbomachine extending around a longitudinal axis, the blade comprising an airfoil with an aerodynamic profile having a leading edge and a trailing edge, the airfoil being formed of a plurality of airfoil sections stacked along an airfoil axis from a radially inner end to a radially outer end of the airfoil, an airfoil height corresponding to a distance along the airfoil axis from the radially inner end to the radially outer end of the airfoil, wherein each airfoil section comprises a leading edge sweep corresponding to an angle between the airfoil axis and a median segment of the leading edge within said airfoil section, wherein each airfoil section comprises a trailing edge sweep corresponding to an angle between the airfoil axis and a median segment of the trailing edge within said airfoil section, wherein a sweep difference of an airfoil section is defined as a difference between the leading edge sweep and the trailing edge sweep, and wherein the sweep difference of an airfoil section is:
- less than 0° and greater than −30°, when the airfoil section has a height comprised between 10% and 30% of the airfoil height,
- greater than 0° and less than +40°, when the airfoil section has a height comprised between 50% and 90% of the airfoil height, and
- between +10° and +30° when the airfoil section has a height comprised between 60% and 90% of the airfoil height.

19. A blade for an unducted fan of a turbomachine, the turbomachine extending around a longitudinal axis, the blade comprising an airfoil with an aerodynamic profile having a leading edge and a trailing edge, the airfoil being formed of a plurality of airfoil sections stacked along an airfoil axis from a radially inner end to a radially outer end of the airfoil, an airfoil height corresponding to a distance along the airfoil axis from the radially inner end to the radially outer end of the airfoil, wherein each airfoil section comprises a leading edge sweep corresponding to an angle between the airfoil axis and a median segment of the leading edge within said airfoil section, wherein each airfoil section comprises a trailing edge sweep corresponding to an angle between the airfoil axis and a median segment of the trailing edge within said airfoil section, wherein a sweep difference of an airfoil section is defined as a difference between the leading edge sweep and the trailing edge sweep, and wherein the sweep difference of an airfoil section is:
- less than 0° and greater than −30°, when the airfoil section has a height comprised between 10% and 30% of the airfoil height, and
- greater than 0° and less than +40°, when the airfoil section has a height comprised between 50% and 90% of the airfoil height, and wherein the sweep difference is increasing with the height for airfoil sections having heights ranging between 10% to 90% of the airfoil height.

* * * * *